United States Patent [19]

Raabe et al.

[11] 4,370,374

[45] Jan. 25, 1983

[54] MULTILAYER PLASTIC FILM, PROCESS FOR ITS PRODUCTION AND ITS USE

[75] Inventors: Fritz Raabe; Robert Schruhl, both of Bonn, Fed. Rep. of Germany

[73] Assignee: Plate Bonn Gesellschaft mit beschrankter Haftung, Bonn, Fed. Rep. of Germany

[21] Appl. No.: 183,042

[22] Filed: Sep. 2, 1980

[30] Foreign Application Priority Data

Sep. 4, 1979 [DE] Fed. Rep. of Germany ....... 2935631

[51] Int. Cl.³ .................... B32B 27/08; B32B 27/40; B32B 31/00
[52] U.S. Cl. .................... 428/216; 156/213; 156/304.4; 156/309.9; 156/322; 156/324.4; 428/215; 428/423.3; 428/423.5; 428/423.7; 428/424.8; 428/474.7; 428/475.2; 428/476.1; 428/476.9; 428/319.3
[58] Field of Search ............... 428/212, 215, 216, 315, 428/423.3, 423.5, 423.7, 424.8, 474.7, 474.9, 475.2, 476.1, 476.9, 483; 156/213, 304.4, 309.9, 322, 324.4

[56] References Cited

U.S. PATENT DOCUMENTS

| | | | |
|---|---|---|---|
| 2,961,365 | 11/1960 | Sroog | 428/287 X |
| 3,762,986 | 10/1973 | Bhuta et al. | 428/474.7 |
| 3,798,115 | 3/1974 | Hofmann et al. | 428/215 |
| 3,843,479 | 10/1974 | Matsunami et al. | 428/476.1 X |
| 3,873,407 | 3/1975 | Kumata et al. | 428/215 |
| 3,914,502 | 10/1975 | Hayashi et al. | 428/336 |
| 3,971,865 | 7/1976 | Murakami et al. | 428/40 |
| 4,008,347 | 2/1977 | Amberg et al. | 428/35 |
| 4,220,683 | 9/1980 | Barker et al. | 428/35 |
| 4,243,074 | 1/1981 | Strutzel et al. | 138/118.1 |
| 4,269,885 | 5/1981 | Mahn | 428/216 |

FOREIGN PATENT DOCUMENTS

| | | |
|---|---|---|
| 2465 | 6/1979 | European Pat. Off. . |
| 2606 | 6/1979 | European Pat. Off. . |
| 52-11704 | 4/1977 | Japan . |

*Primary Examiner*—P. E. Willis, Jr.
*Attorney, Agent, or Firm*—Mandeville and Schweitzer

[57] ABSTRACT

The invention provides a multilayer plastics film comprising at least two film layers, one of which has a thickness of 10 to 50 μm and a softening point of 140° to 200° C., and the other of which has a thickness of 10 to 50 μm, a softening point of 70° to 130° C. and initial melting point of from 100° to 190° C., there being a temperature difference of from 30° to 60° C. between the softening point and initial melting point of the latter film. The invention also provides processes for making such multilayer plastics films and their use for applying to articles, particularly foamed plastics, a firmly adhering skin.

17 Claims, 1 Drawing Figure

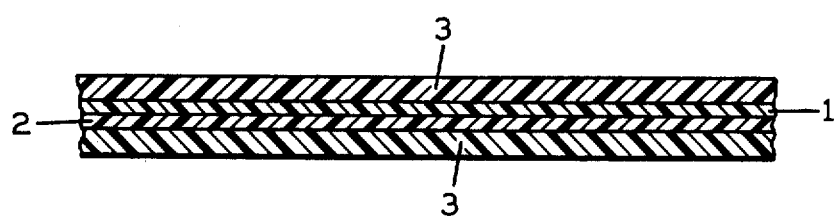

MULTILAYER PLASTIC FILM, PROCESS FOR ITS PRODUCTION AND ITS USE

The present invention relates to a multilayer plastics film, a process for its production and its use for encapsulation, particularly of foamed plastics materials. Plastics films are known in numerous modifications. A special field of application for plastics films lies in encapsulating objects made of foamed plastics materials, e.g. plates or films, interior bodies, such as tubular insulations for heating pipes and the like, on the outside with a plastics film, so as to impart a smooth skin to the objects in this way. This type of smooth surface is desirable, inter alia, for the reason that the latter can be cleaned more easily than the foamed plastics surface, provided with large pores. A further achievement of the encapsulation is that water cannot pass into the foamed material; in this way, the foamed material is largely protected from decomposition. The films can be printed or painted on, which is difficult or altogether impossible in the case of foamed plastics surfaces.

The plastics films, with which the foamed plastics objects are encapsulated, have to fulfil stringent mechanical requirements, especially regarding flexibility. In addition, they must be firmly joined to the surface of the foamed plastics bodies, not form blisters and retain a durable bond. No large mechanical forces can be applied for the encapsulation of the foamed plastics bodies, because the foamed plastics bodies would have to be strongly compressed during the pressing of the film used for encapsulation. This can have the result that the foamed plastics bodies do not completely regain their original shape.

The use of solution adhesives has the disadvantage that the solution adhesive sinks into the foam and that the solvent is difficult to volatilise.

The use of contact adhesives has the disadvantage that, following encapsulation, the encapsulated foamed plastics bodies are sensitive towards permanent deformations. Moreover, the contact adhesive films have to be covered on the adhesive side with a silicone-coated protective film, which is expensive.

The present invention is based on the problem of providing a plastics film, with which foamed plastics bodies can be encapsulated without the application of adhesives such as contact or solution adhesives. It has been surprisingly found that this problem can be solved by the multilayer plastics film as hereinafter defined.

According to the present invention, there is provided a multilayer plastics film, which is characterised in that it comprises at least two films, joined together, the first film having a thickness of from 10 to 50 $\mu$m and a softening point of from 140° to 250° C., and the second film having a thickness of from 10 to 50 $\mu$m, a softening point of from 70° to 130° C. and an initial melting point of from 100° to 190° C., there being a temperature difference of from 10° to 60° C. between the softening point and initial melting point of said second film.

The process for the production of this multilayer plastics film is characterised in that the two films hereinbefore defined are joined together under the influence of heat and pressure or that these films are co-extruded. A further subject of the invention is the use of the multilayer plastics film as defined above for encapsulation, particularly of foamed plastics materials.

The essential idea of the invention therefore consists in the multilayer plastics film possessing on one side a film having a relatively high softening point and, on the other side, a film having a relatively low softening point. Preferably, the thickness of one or of both these films is at least about 20 $\mu$m and at most about 40 $\mu$m, with particular preference for about 30 $\mu$m.

The softening point and the initial melting point as well as the final melting point, which is not of particular interest in this case, are determined as follows. Pieces of the plastics material under test, having an area of about 1 mm$^2$ and a thickness of about 1 mm, are placed on to a Kofler heating bench. After these pieces have been lying on the Kofler heating bench for 1 minute, a spatula is used to determine, at what temperature the plastics test pieces are capable of plastic deformation without the action of major force. The minimum temperature thus ascertained is the softening point. The lowest temperature, at which threads can be drawn between the softened test piece and the spatula on lifting off the spatula from the plastics test pieces, is the initial melting point. The final melting point is that minimum temperature, at which the test pieces lose their structure and liquefy. Obviously there is a certain tolerance in these measurements but from experience they lie within the range of only from about ±3° to 4° C.

It is preferred that the higher-melting film possesses a softening point of at least approximately 160° C. and at most approximately 220° C. with particular preference for about 200° C.

On the other hand, it is preferred that the low-melting film possesses a softening point of at least approximately 80° C. and at most approximately 120° C., and an initial melting point of at least around 120° C. and at most around 160° C.

As regards the temperature difference between softening point and initial melting point, it is preferred that this is from 10° C. to 30° C. in the case of polyamides and at least 30° C. and at most around 50° C. in the case of polyesters and polyurethanes.

The multilayer plastics film appropriately has a width of more than 80 cm, preferably of at least 100 cm. Normally it is extremely difficult to produce multilayer plastics films having this kind of width but surprisingly this is feasible with the process according to the invention. The length of the films is normally at least 1 m but as a rule the films are produced in long lengths of several hundred meters, which are rolled up on reels.

The multilayer plastics film can consist of any plastics materials, which possess adhesive properties at elevated temperature. Typical examples of these are polyurethanes, polyamides and copolyesters. Films of this composition have gained technical importance as hot-melt adhesives. Plastics materials of this kind that are suitable as hot-melt adhesives are described in numerous patent specifications and other literature references, for example West German Patent Specification No. 1,253,449 and West German Offenlegungsschriften No. 2 324 159, 2 324 160 and 2 823 762.

Polyurethane films have the advantage that they are particularly elastic. The choice of the plastics material depends on the application desired. It can also be made according to the chemical composition of the objects, particularly of the foamed plastics materials, which are to be encapsulated with the multilayer plastics films according to the invention. The choice has to be made in such a way that there is good compatibility between the multilayer plastics film and the foamed plastics material to be encapsulated, i.e. that the multilayer plastics film according to the invention can be thoroughly and satisfactorily stuck to the foamed plastics material under the influence of heat and pressure. Particularly good results are achieved by sticking multilayer plastics films made of polyurethane to foamed plastics materials made of polyurethane. Polyurethane foamed plastics materials have a particularly great technical importance and are employed on a very large scale. Multilayer plastics films according to the invention, based on copolyamides or copolyesters, can however also be satisfactorily stuck to foamed plastics materials of this type.

Appropriately, the multilayer plastics film is provided, on one side or on both sides, with a protective film that can be stripped off. This applies, in particular, to films based on polyurethane and/or copolyamide. Particularly suitable protective films for this purpose are polyethylene films, since they do not firmly adhere to the polyurethane or copolyamide films and can be easily stripped off. Protective films of this kind are easy to produce, since they need not possess any additional coating with a separating compound, e.g. silicone. The individual plastics films that are to be joined to produce a multilayer plastics film according to the invention can each be produced in a manner that is known per se, by co-extrusion with a protective film in the form of tubes, which are then cut open. A film, provided with a protective film on one side in this way, then is joined to another film, similarly provided with a protective film, and/or to a film not provided with protective films in such a way that the sides that are not provided with protective films stick together and protective films protect one or both external sides of the multilayer plastics film. Other plastics films, e.g. polypropylene, can also be employed as protective films.

The multilayer plastics film according to the invention may also consist of more than two plastics films, (not counting possible protective films). For example, it is possible to interpose between the low-melting film and the higher-melting film one or more films, the softening point or initial melting point of which respectively lies between those of the two outer films. It is however also possible for the centre film to possess a higher softening point and initial melting point than the two outer films. A multilayer film of this type, therefore, then possesses one or more centre films, having a particularly high thermal stability. This may be of advantage in cases in which, following encapsulation of an object with the multilayer plastics film according to the invention, the resultant externally placed, relatively high-melting side of the film is to be temporarily softened, without the bond to the coated body being impaired.

Production of multilayer plastics films of this type, consisting of at least three films, can be effected in such a way that all the films to be joined are simultaneously joined together, as will be explained below. It is however also possible to join two films to each other and then to integrate this double plastics film with one or more additional films, simultaneously or in succession. In any event, the particular outer sides can be coated with protective films as has been described above. Prior to integration with additional films, any outer protective film that may be present has, evidently, to be stripped off.

Printing and/or painting on the multilayer plastics film is possible, as this is known in the case of single films. The film according to the invention may also possess a structured surface, e.g. grained. Structuring is suitably effected after the production of the multilayer plastics film.

Customary devices can be employed for joining the two films under the influence of pressure and temperature. Appropriately, so-called thermo-calenders are employed, consisting of two heated rollers, between which the films to be integrated pass through. The temperature of the roll is is to be adjusted so that the films adhere, but, otherwise, are not overheated and thus damaged.

Several films can also be co-extruded simultaneously, so-called multilayer extrusion heads, e.g. three-layer heads, four-layer heads etc being employed. If, for example, a three-layer head is used, three tubular films then are simultaneously extruded in concentric arrangement and are joined to one another immediately after egress from the three-layer head. It is possible to co-extrude with multi-layer heads of this kind two or several films to be stuck together and one or two protective films as the corresponding inner or outer films. Extrusion of more than two concentric tubular films, especially of more than three concentric tubular films, however, is relatively difficult, so that it is preferred in cases of this kind to integrate additional films that may have to be joined together, after extrusion.

It is most surprising that integration of the films according to the invention can be satisfactorily carried out, no formation of blisters occurring between the two films, although the films employed are extremely thin and possess differing physical properties, as defined above.

The multilayer plastics film according to the invention can be stuck with its low-melting side to objects that are to be encapsulated. Adhesion can be effected by heating the multilayer plastics film to, or little above, the softening point of the low-melting film and applying it to the object to be encapsulated. The low-melting film thus acts as thermoplastic adhesive. As has already been explained above, it is particularly advantageous to employ the multilayer plastics film according to the invention for the encapsulation of foamed plastic bodies. An extremely firm bond to the foamed plastics body is formed. The outer side of the film retains its excellent closed, optionally structured, printed and/or painted surface. A compound body is obtained in this case in a surprisingly simple manner having a foamed plastics material and a surface, devoid of pores, which can be employed for a variety of applications. The insulation for pipes, e.g. heating pipes or hot water pipes, as referred to earlier, as well as foamed plastics panels or foamed plastics mats in the construction of motor vehicles, construction of aircraft etc may be mentioned as examples.

The multilayer plastics film according to the invention can however also be advantageously employed for the encapsulation of other objects, particularly of textile fleeces or textile fabrics, cellulose tracks, objects including films and panels made of other plastics materials, especially polyvinyl chloride.

The invention is illustrated by means of the FIGURE attached. The FIGURE represents a much enlarged cross-section through a multilayer plastics film according to the invention. The higher-melting plastics film is denoted with 1 and the low-melting one with 2. Both sides of this multilayer plastics film are provided with protective films 3 in the FIGURE.

EXAMPLE 1

A polyurethane film having a thickness of 30 μm obtained from a OH-containing polyester, butandiole and diphenyl methane diisocyanate (polyurethane ESTANE 5713, registered trademark), which contains on one side a polyethylene protective film, the polyurethane film having a softening point of 100° C. and an initial melting point of 150° C., is with the surface, which does not have the protective film, on a calender joined with a polyurethane film having a thickness of 30 μm prepared from an OH-containing polyester, butandiol and diphenylmethandiisocyanate (polyurethane ELASTOLLAN C 85 A 10, registered trademark) and having a softening point of 170° C. and an initial melting point of 200° C. The temperature of the heating roll of the calender is 130° C. The operating speed is 10 m per minute. The residential time of 1 second on the heating roll is sufficient to join firmly both polyurethane films.

The lower melting polyurethane film also contains on one side (the outer side) a polyethylene protective film.

After peeling off the protective film the higher melting film may be printed using a normal printing apparatus, preferably continuously, using a lacquer, which as binding agent preferably contains a polyurethane, as a pigment contains titanium dioxide and as a solvent dimethylformamide, cyclohexanone and diacetone alcohol.

EXAMPLE 2

The process is carried out basically as described in example 1. The higher melting film is a polyamide 6-film, having a thickness of 40 μm and a softening point of approximately 200° C.

The lower melting film is a polyurethane film, having a thickness of 30 μm, a softening point of 100° C., and initial melting point of 150° C., such as has been used in example 1. The operating speed of the calender is 8 m per minute and the temperature of the heated roll is 140° C.

EXAMPLE 3

The process is carried out as described in Example 1. However, as higher melting film there is used a polyurethane film having a thickness of 40 μm and a softening point of 150° C. The lower melting film is a polyamide film consisting of a copolyamide from 40 parts by weight caprolactum, 40 parts by weight laurinlactam and 20 parts by weight AH-salt (salt of adipic acid and hexamethylene diamine). The polyamide film is the commercial product PLATAMID H 105 (registered trademark). The thickness is 30 μm, the softening point approximately 107° C. and the initial melting point 118° C. The operating speed of the calender is 10 m per minute and the temperature of the heated roll is 135° C.

EXAMPLE 4

A polyester film on the basis of terephthalic acid, isophthalic acid, dimeric fatty acids and butandiole having a softening point of 105° C. and an initial melting point of 135° C. and having a thickness of 30 μm is bonded onto a polyurethane film having a softening point of 150° C. and a thickness of 40 μm, using an electro type ironing press. The pressing temperature is 140° C. and the pressing time is 15 seconds.

EXAMPLE 5

A multilayer plastics film, obtained according to example 1, which still contains the polyethylene protective film on the higher melting surface, is placed with its lower melting surface onto a plate of polyurethane foamed plastic (commercial product Moltopren, registered trademark). In an electrotype ironing press there is applied a temperature of 130° C. for 10 seconds. There is obtained a firm adhesive joint between the surface of the foamed plastic and the multilayer plastics film, and the multilayer plastics film forms a stable skin of the foamed plastic. It is almost impossible to peel off the skin from the foamed plastics body. The protective film may be peeled off the skin at any desired time.

We claim:

1. Multilayer plastic film useful for encapsulating objects, which comprises
   (a) a first individual film having a thickness of from 10 to 50 microns and a softening point of from 140° to 250° C., and
   (b) a second film having a thickness of from 10 to 50 microns, a softening point of from 70° to 130° C. and an initial melting point of from 100° to 190° C., there being a temperature difference of from 10° to 60° C. between the softening point and the initial melting point of the second film.

2. Multilayer plastic film according to claim 1, characterized in that at least one of said individual films has a thickness of from 20 microns to 40 microns.

3. Multilayer plastic film according to claim 1, characterized in that the first film possesses a softening point between 160° C. and 220° C.

4. Multilayer plastic film according to claim 1, characterized in that the second film possesses a softening point of between 80° C. and 120° C. and an initial melting point of from 120° C. to 160° C.

5. Multilayer plastic film according to claim 4, characterized in that the second film possesses a softening point between 90° C. and 110° C. and an initial melting point of from 130° C. to 150° C.

6. Multilayer plastic film according to claim 1, characterized in that there is a temperature difference of from 30° C. to 50° C. between the softening point and the initial melting point of the second film.

7. Multilayer plastic film according to claim 1, characterized in that
   (a) at least one further individual film is interposed between said first and second films,
   (b) said further film having a softening point which respectively lies between those of said first and second films.

8. Multilayer plastic film according to claim 1, characterized in that
   (a) at least one further individual film is interposed between said first and second films,
   (b) said further film having an initial melting point higher than those of said first and second films.

9. Multilayer plastic film according to claim 1, characterized in that it is more than 80 cm wide and more than 1 m long.

10. Multilayer plastic film according to claim 1, characterized in that at least one of said individual films comprises polyurethane, polyamide or polyester.

11. Multilayer plastic film according to claim 1, characterized in that it possesses at least one side protective film capable of being stripped off.

12. Multilayer plastic film according to claim 11, characterized in that
   (a) said protective film is made of polyethylene, and
   (b) at least one of said other films comprises polyurethane or copolyamide.

13. Multilayer plastic film according to claim 1, characterized in that it is structured, printed or painted on.

14. Process for the production of a multilayer plastic film as defined in claims 1, 2, 3, 4, 5, 6, 7, 8, 9, 10, 11 or 12, comprising:
   (a) joining together the individual film layers of said multilayer plastics film under the influence of heat and pressure.

15. Process for the production of a multilayer plastic film as defined in claims 1, 2, 3, 4, 5, 6, 7, 8, 9, 10, 11 or 12 comprising:
   (a) coextruding said multiple layer film.

16. Use of a multilayer plastic film according to claims 1, 5, 7, 8 or 10 for applying to foamed plastic articles a firmly adhering skin.

17. Process for preparing an article having a firmly adhering skin using the multilayer plastic film of claim 1, 5, 7, 8 or 10 comprising:
   (a) heating the multilayer plastic film to or a little above the softening point of the second film, and
   (b) applying it to the article.

* * * * *